United States Patent

[11] 3,592,038

[72] Inventor Leo Larikka, IV Linja 17-19 B 3,
 Helsinki, Finland
[21] Appl. No. 744,087
[22] Filed July 11, 1968
[45] Patented July 13, 1971
[32] Priority July 11, 1967, Apr. 4, 1968, May 16, 1968
[33] Finland
[31] 1905/67, 929/68 and 1379/68

[54] TOOL AND/OR MACHINE TOOL TO WORK A HOLE AND ITS FLANGE INTO A WALL FOR A BRANCH PIPE TO BE ATTACHED TO THE WALL
5 Claims, 4 Drawing Figs.
[52] U.S. Cl.................................................. 72/325,
 72/112, 29/157, 77/65
[51] Int. Cl...................................................B21d 31/02,
 B21d 1/02, B21d 53/00

[50] Field of Search............................................. 72/71, 325,
 112, 464; 29/157 T; 77/65

[56] References Cited
UNITED STATES PATENTS
3,234,573  2/1966  Halpern......................... 77/65
2,437,822  3/1948  Jones............................. 77/65

Primary Examiner—Charles W. Lanham
Assistant Examiner—R. M. Rogers
Attorney—Holman and Stern ABSTRACT: The formation of a hole and a flange surrounding the hole in a wall and to which flange a branch pipe is attached including a drill provided with at least two elements which, following the drilling of the hole are capable of being extended to a location under the edge of the hole so that upon withdrawal of the drill the elements coact to form a projecting flange at the edge of the hole.

PATENTED JUL 13 1971 3,592,038
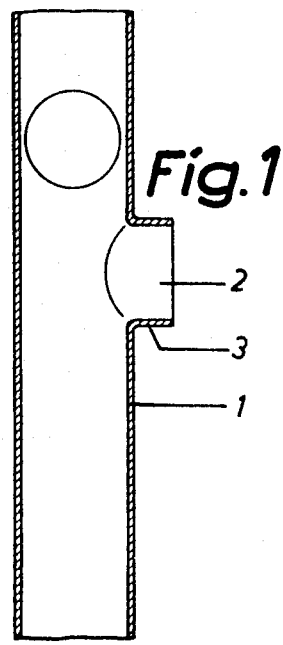
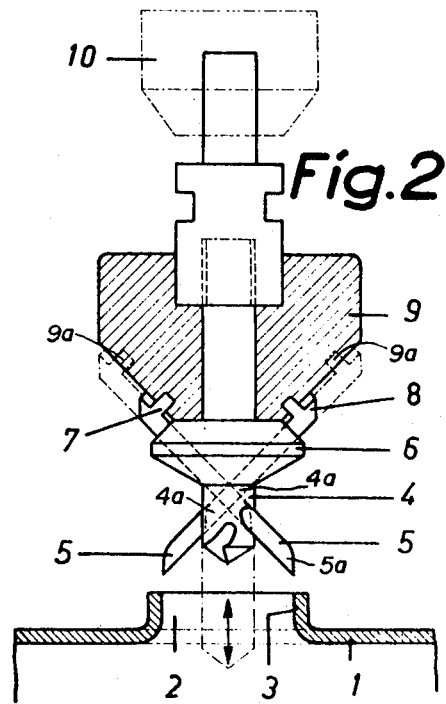
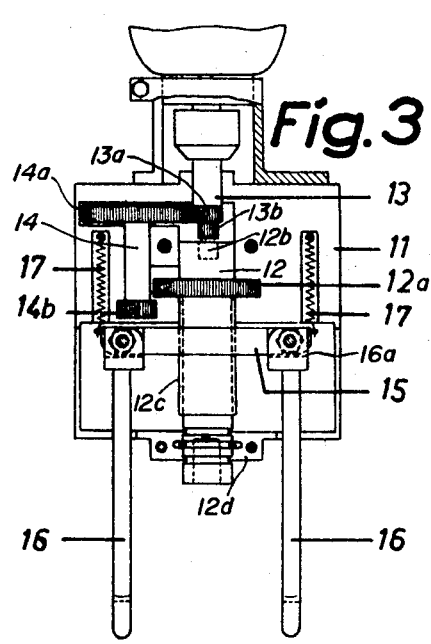
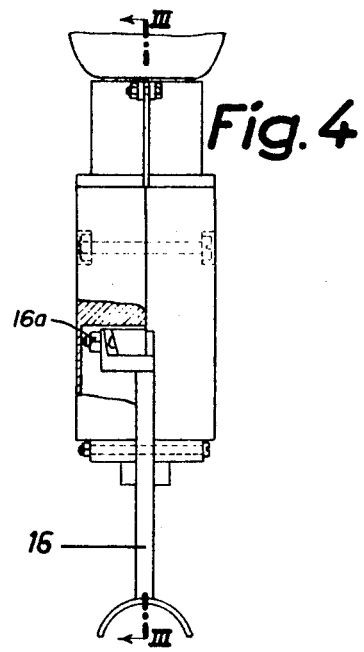
INVENTOR
LEO LARIKKA
BY Glassock, Downing & Seebold
ATTORNEYS

TOOL AND/OR MACHINE TOOL TO WORK A HOLE AND ITS FLANGE INTO A WALL FOR A BRANCH PIPE TO BE ATTACHED TO THE WALL

BACKGROUND OF THE INVENTION

This invention relates to the formation of a hole and a flange surrounding the hole in the wall of the pipe and by means of which flange a branch pipe is attached to the wall.

When branch pipes are secured to a wall such as for example to the wall of a pipe, special branch elements may be employed. It is then necessary to cut off the pipe at the branch point and secure the cut off pipe ends and the end of the branch pipe onto the branch element. This technique is most laborious and expensive.

In another well known technique, a hole is made by a drill, saw or a file for the end of the branch pipe but it is extremely difficult to obtain a proper connection by this particular technique. The edges of the hole remain sharp and undesirable respecting streamlining. An easily flowing solder cannot be employed at the connection but rather it is necessary to use hard solder which necessitates a high soldering temperature.

In a third well known technique, a hole is made in the wall of the pipe and a flange is produced at the hole. Heretofore, tools such as a separate drill have been employed for forming the hole and the edge of the hole has been formed into a flange by manual tools. A disadvantage of the above resides in the large number of tools required and the time and professional skill necessary by the use of such tools. In addition, before the flange could be formed the edge of the hole had to be softened by heating.

The object of the present invention is to provide a tool and/or machine tool by means of which a hole and its surrounding flange can be provided for a wall in order to enable a branch pipe to be attached to the wall.

SUMMARY OF THE INVENTION

The tool according to the invention comprises a drill for forming the hole in the wall and expanding means for producing the projecting flange. More specifically, the expanding means includes at least two flange forming members capable of movement following the drilling of the hole so as to protrude from the drill whereby upon withdrawal of the drill from the hole such members coact with the wall to form a flange at the edge of the hole.

Yet a further object of the invention is to provide a tool which can be attached to an ordinary drilling machine.

A further object of the invention is to provide a special machine tool for enabling the assemblage to be more effectively employed.

Further objects and advantages of the invention will become more readily apparent to persons skilled in the art from the following detailed description and attached drawings, in which drawings:

BRIEF DESCRIPTION OF THE DRAWING

FIG. 1 is a fragmentary view in cross section illustrating a pipe provided with two holes with one of the holes having a flange for enabling a branch pipe to be attached to the pipe, FIG. 2 is a view partly in elevation and partly in cross section of a tool and chuck of one embodiment of the invention with the tool being in its position following withdrawal from the hole made in the pipe and illustrating the flange surrounding the edge of the hole, FIG. 3 is a view taken alone line III—III of FIG. 4, the view looking in the direction of the arrows, and FIG. 4 is a side elevational view partly broken away of the machine tool illustrated in FIG. 3.

DETAILED DESCRIPTION OF THE INVENTION

FIG. 1 is illustrative of the environment of the invention in which a wall as in the cap of a pipe 1 is formed with a hole 2 and a flange 3 surrounding the hole 2. A branch pipe is adapted to be secured to the pipe 1 via the flange 3.

With respect to the tool by which such a hole and its flange is produced attention is directed to FIG. 2 in which a metal drill 4 is provided with two bores 4a on both sides of the centerline thereof. The bores 4a define with the center axis of the drill 4 an angle so that flange-forming tools 5 positioned in the bores can project from the drill 4 to a point below a supporting extension 6 as shown by the full lines in FIG. 2 so that between the upper edge of the protruding tool 5 and the lower part of the extension 6 there remains an unbroken cylindrical surface at least as thick as the wall of the pipe 1.

A regulating device, part of which includes a cone 9 has a taper which corresponds to the angle between the flange-forming tools 5 and which is provided with symmetrical notches 9a in which a projection 7 adjacent the upper end of each flange-forming tool 5 can be lodged. The projection 7 maintains the tool 5 axially in close contact with the cone 9 and a planar extension 8 prevents rotation of the flange-forming tool 5 about its axis.

It will be appreciated upon turning the cone 9 towards the drill 4, the tools 5 move in their axial directions and can be positioned for flange diameters of different sizes.

When the hole 2 is to be formed in the pipe wall, the flange-forming tools are in the dotted line positioned illustrated in FIG. 2 and following drilling of the hole, the drill is pushed into the pipe up to the extension 6. Upon turning the cone 9, the flange-forming tools are forced or pushed inside of the pipe 1 below the edge of the hole 2 and are locked at the desired location by means of the regulating device. Thereafter, while the drill 4 continues to rotate, the drill is withdrawn from the pipe whereupon the flange-forming tools 5 deform the edge of the hole to form a flange 3 which constitutes a supporting collar to which a branch pipe can be readily attached such as by soldering.

It will be noted that the lower ends of the flange-forming tools 5 are beveled as at 5a and define, at the forming locating, the smallest possible contact angle. A clamping device 10 of the drilling machine is indicated by the dotted line.

At tests conducted, the device has proven to be quite rapid in operation since the hole 2 and its flange 3 can be produced by the same device and a mechanical tool. Branch holes of different sizes can be produced by the tool for pipes and surface plates of all dimension.

In another embodiment (not illustrated) movable rollers are attached by joints to the cylindrical frame of the drill with such rollers being located within the frame during the drilling of the primary hole. After drilling through the wall, the drill is forced deeper into the pipe and by virtue of the regulating device at the shaft of the drill, the rollers moving by joint means are transferred in order that the lower ends extend from the drill frame. The position of the rollers can be regulated by different positions of the regulating device whereby a pipe branch of desired size is obtained.

The flange for the branch pipe is formed during the rotation of the drill and its simultaneous withdrawal from the pipe whereupon the rollers form the edge of the hole and provide the upstanding flange at the branch point and to which the branch pipe can be readily attached by soldering or welding.

In FIGS. 3 and 4, there is illustrated a machine tool including a frame 11 in which a cylindrical member 12 is mounted for axial movement. A toothed wheel 12a is carried by the cylindrical member and the upper portion of the cylindrical member functions as a bearing and is provided with internal teeth 12b. The member 12 is also provided with a thread 12c below the wheel 12a and a lower unthreaded portion functions as a bearing. A spring lock 12d serves to lock the cylindrical member 12 in its desired position. An assemblage such as the drill 4 and the flange-forming tools 5 is adapted to be attached to the cylindrical member 12.

A drive shaft 13 is located above the cylindrical member and is provided with toothed wheels 13a and 13b at its lower end. The toothed wheel 13b is adapted to mesh with the internal teeth 12b of the cylindrical member 12 when such member is in its upper position.

A shaft 14 is spaced from and arranged in parallelism to the member 12 and shaft 13 and is provided at its upper end with a toothed wheel 14a which is in mesh with the toothed wheel 13a and at its lower end with a second toothed wheel 14b. In the lower position of the cylindrical member 12, the toothed wheels 12a and 14b are in mesh.

It will be appreciated that in the upper position of the cylindrical member 12, the gear 13b and teeth 12b are in engagement and the turning moment and velocity of the drill runs unchanged throughout the assemblage. Upon moving the member 12 to the lower position, the toothed wheels 12a and 14b engage and the drive is then through toothed wheel 13a, toothed wheel 14a, toothed wheel 14b and toothed wheel 12a whereby the moment increases according to the transmission ratio and correspondingly the rotational velocity of the cylindrical member 12 decreases.

A nut 15 is divided into two parts and is provided with inner threads. When the nut is closed, its threads coact with the thread 12c of the member 12 to effect the feeding. Supporting shafts 16 are attached to the nut part 15 by joints 16a whereby upon turning down the shafts, due to the wedgelike surfaces of the joints (FIG. 4), the parts of the nut are pressed together thus fixing the threads between the member 12 and the nut part 15. During rotation of the cylindrical member 12, the nut 15 and the supporting shaft 16 move by virtue of the action of the thread causing the distance between the assemblage attached to the member 12 and the piece to be worked such as the pipe 1 in FIG. 1., to be either longer or shorter depending upon the pitch of the thread or the direction of rotation. The supporting shafts 16 become attached to the piece to be worked thereby receiving all the power.

Spring 17 function to return the nut 15 and the supporting shaft 16 to the original position following the opening of the nut. The assemblage can be employed for many purposes when a large moment is required and when an axial movement of constant speed is necessary between the working piece and the piece to be worked.

A tool of the type illustrated in FIG. 2 can be attached to the machine tool shown in FIGS. 3 and 4 and the drill 4 per se can be divided into two or more presses.

This invention is not to be confined to any strict conformity to the showings in the drawings but changes or modifications may be made therein so long as such changes or modifications mark no material departure from the spirit and scope of the appended claims.

What I claim is:

1. In an assemblage for forming a hole and a surrounding upstanding flange for a wall and to which flange a branch pipe is adapted to be attached, a drill, and at least two flange-forming tools symmetrically arranged on the drill for movement from a position in which the tools are within the confines of the drill to a position projecting from the drill whereby following drilling of the hole, the tools are extended to underlie the edge of the hole and upon the withdrawal of the drill, the tools deform the wall to produce the upstanding flange at the edge of the hole.

2. The assemblage as claimed in claim 1 in which said drill is provided with inclined bores extending therethrough in each of which bores a flange-forming tool is positioned, and supporting means for the upper ends of tools for enabling the tools to be positioned the desired projecting distance from the drill.

3. The assemblage as claimed in claim 2 including a regulating device defined by a conical element having a taper corresponding to the angle between the flange-forming tools, said element having at least two spaced notches, and said supporting means being a projection selectively engageable with one of the notches so that upon rotation of the conical element, the tools move axially to the desired position relative to the drill.

4. The assemblage as claimed in claim 3 in which the lower end of each flange-forming tool is bevelled.

5. The assemblage as claimed in claim 1 in which said drill is divided into at least two components.